United States Patent
Bertram (10) Patent No.: US 10,892,909 B2
(45) Date of Patent: Jan. 12, 2021

(54) AUTOMATION SYSTEM, SERIES TERMINAL FOR AUTOMATION SYSTEMS AND ASSOCIATED METHOD

(71) Applicant: WAGO Verwaltungsgesellschaft mbH, Minden (DE)

(72) Inventor: Wolfgang Bertram, Gau-Algesheim (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 136 days.

(21) Appl. No.: 16/378,961

(22) Filed: Apr. 9, 2019

(65) Prior Publication Data

US 2019/0312750 A1 Oct. 10, 2019

(30) Foreign Application Priority Data

Apr. 9, 2018 (DE) .......................... 10 2018 108 309

(51) Int. Cl.
*H04L 12/28* (2006.01)
*G06F 16/903* (2019.01)
(Continued)

(52) U.S. Cl.
CPC ...... *H04L 12/2867* (2013.01); *G06F 13/4063* (2013.01); *G06F 16/903* (2019.01);
(Continued)

(58) Field of Classification Search
None
See application file for complete search history.

(56) References Cited

U.S. PATENT DOCUMENTS 9,405,283 B1 * 8/2016 Damico ............. G05B 19/0426
9,774,584 B2 * 9/2017 Fischer ................... H04L 63/08
(Continued)

FOREIGN PATENT DOCUMENTS

CN             203232424 U   * 10/2013
DE       102013206147 A1      10/2014
(Continued)

OTHER PUBLICATIONS

Swaminathan et al., "The Secure Field Bus (SecFB) Protocol—Network Communication Security for secure Industrial Process control", IEEE, 2006, 4 pages. (Year: 2006).*
(Continued)

*Primary Examiner* — Michael Pyzocha
(74) *Attorney, Agent, or Firm* — Muncy, Geissler, Olds & Lowe, P.C.

(57) ABSTRACT

A series terminal for an automation system, having an insulating housing, which has an electrical contact on at least one side of the housing with which the series terminal can be connected with a data bus of an automation system. The series terminal comprises an integrated electronic processing unit which is connected to the at least one contact device and is designed for transmitting and/or receiving data via the data bus. In this case, the integrated electronic processing unit is set up to query a configuration of the automation system and, based on the configuration, to generate an individual cryptographic key for the automation system in conjunction with a secret cryptographic key stored in the series terminal.

18 Claims, 5 Drawing Sheets

(51) Int. Cl.
*H04L 9/08* (2006.01)
*H04L 9/00* (2006.01)
*G06F 13/40* (2006.01)

(52) U.S. Cl.
CPC ............ *H04L 9/006* (2013.01); *H04L 9/0894* (2013.01); *H04L 12/2858* (2013.01)

(56) References Cited

U.S. PATENT DOCUMENTS

| | | | |
|---|---|---|---|
| 9,817,783 | B2 | 11/2017 | Podrouschek et al. |
| 10,095,858 | B2* | 10/2018 | Haija ................... G06F 21/44 |
| 2010/0153736 | A1* | 6/2010 | Kilian ............... G05B 19/4185 |
| | | | 713/185 |
| 2011/0107377 | A1* | 5/2011 | Petrisor .................. H04L 45/18 |
| | | | 725/76 |
| 2012/0066503 | A1* | 3/2012 | Koppers ............ G05B 19/4186 |
| | | | 713/176 |
| 2013/0010965 | A1* | 1/2013 | Falk ......................... H04L 9/14 |
| | | | 380/277 |
| 2013/0304385 | A1* | 11/2013 | Gillette, II .............. H02J 50/00 |
| | | | 702/6 |
| 2014/0229735 | A1* | 8/2014 | Holleis ................... H04L 63/18 |
| | | | 713/171 |
| 2014/0304511 | A1* | 10/2014 | Lewis ................... H04L 9/0637 |
| | | | 713/170 |
| 2015/0309493 | A1* | 10/2015 | Patel ...................... G06N 20/00 |
| | | | 700/275 |
| 2016/0269230 | A1* | 9/2016 | Baker ..................... H04L 67/12 |
| 2017/0024586 | A1* | 1/2017 | Aldrian .................. G06F 21/78 |
| 2017/0308708 | A1 | 10/2017 | Kim et al. |
| 2017/0331860 | A1* | 11/2017 | Ofversten ............... H04W 4/70 |
| 2018/0357397 | A1* | 12/2018 | Fink ....................... H04L 63/068 |
| 2018/0359220 | A1* | 12/2018 | Trivelpiece ........... G06F 21/602 |
| 2019/0052613 | A1* | 2/2019 | Karlsen ................. H04L 63/062 |
| 2019/0089524 | A1* | 3/2019 | Lv ...................... H04L 12/40032 |
| 2019/0317914 | A1* | 10/2019 | Norenburg ............ G06F 3/0607 |
| 2019/0340389 | A1* | 11/2019 | Hattori ................. G06F 21/6254 |
| 2019/0370505 | A1* | 12/2019 | Venema ................ H04L 9/0897 |
| 2020/0036520 | A1* | 1/2020 | Kilian ..................... G06F 21/64 |

FOREIGN PATENT DOCUMENTS

| | | | |
|---|---|---|---|
| DE | 102014114692 A1 | 4/2015 | |
| JP | 2016090884 A | * 5/2016 | |
| WO | WO-2018051817 A1 | * 3/2018 | ............... H04L 9/08 |

OTHER PUBLICATIONS

Sauter, Thilo et al., "Achievement of secure Internet access to fieldbus systems", Microprocessors and Microsystems 26 (2002), pp. 331-339. (Year: 2002).*

Hausmann, Stefan et al., "Usage of Public Key Infrastructures in Automation Networks", IEEE 2012, 4 pages. (Year: 2012).*

* cited by examiner

AUTOMATION SYSTEM, SERIES TERMINAL FOR AUTOMATION SYSTEMS AND ASSOCIATED METHOD

This nonprovisional application claims priority under 35 U.S.C. § 119(a) to German Patent Application No. 10 2018 108 309.2, which was filed in Germany on Apr. 9, 2018, and which is herein incorporated by reference.

BACKGROUND OF THE INVENTION

Field of the Invention

The present invention relates to an automation system comprising a head end and at least one series terminal, which is formed by means of an interface for connection to a local bus, which is provided by the head end, such that the series terminal is connected or connectable to the head end via the local bus. The invention also relates to a series terminal for automation systems, which is connectable to a local bus of an automation system. The invention also relates to a method for secure communication via a data bus of an automation system comprising a head end and at least one series terminal.

Description of the Background Art

Automation systems and series terminals for automation systems are well known from the prior art. As a rule, a series terminal has an insulating housing, which has two opposite, flat and mostly planar housing sides so that the series terminals can be arranged and organized next to each other.

On these sides of the housing via which the series terminals can be arranged side by side, a generic series terminal has electrical contacts with which two adjacent series terminals or a head end and a series terminal can be in electrical connection with one another. This electrical connection via the electrical contact serves to connect the series terminal with a local bus which is usually provided by the head end, such that by the juxtaposition of the series terminals and the electrical contacting of the respective electrical contact, a common data bus is formed, which among other things serves to forward data from the series terminal to other devices, in particular to the head end (a control module) and to a control computer, or to receive data from a control computer or a head end.

To form the data bus, a series terminal, which has an electrical contact on opposite sides of the housing, comprises an internal electrical bridge in order to be able to connect the contact device to the respectively opposite sides of the housing. Thus, data from the data bus can be transmitted through such a series terminal to other series terminals.

Such automation systems, which are formed from a head end and a plurality of such generic series terminals, can be used in particular for controlling production plants, for energy supply systems, in-home automation, transport infrastructure, medical technology and other fields to integrate automated controls and regulations.

With the increasing demand for opening such automation systems to the outside in order to ensure access to the configured regulation and control, the safety aspect of such automation systems is drawing more and more attention. Unauthorized third parties must be effectively prevented from gaining access to the configured regulation and control in order to prevent attacks on automation systems and their associated infrastructure for purposes of sabotage or espionage.

In practice, it is therefore known that the head end (also called control module or bus coupler), which provides the connection of the series terminals to the local bus and can provide a data line to an external control computer, has appropriate security mechanisms that aim to prevent unauthorized access to the automation system. However, normally cryptographic keys or security certificates are directly stored in the head end so that in the event of a successful attack on the automation system starting at the head end, a potential attacker would receive all the information he needs for unauthorized access to the automation system.

DE 10 2013 206 147 A1, which corresponds to U.S. Pat. No. 9,817,783, discloses a series terminal for a data bus, which has a software protection feature with the aid of which data from the series terminal can be encrypted or decrypted and with which a license review can be carried out in order to link the execution of the control logic to a valid license.

The disadvantage here, however, is that the cryptographical key must be deposited in the series terminal in advance, so that with the knowledge of the externally generated cryptographic key, an attack on the automation system for the purpose of sabotage or manipulation would be possible.

SUMMARY OF THE INVENTION

It is therefore an object of the present invention to provide an improved automation system as well as an improved series terminal and an improved, associated method, by means of which external attacks on the automation system and deriving information from the cryptographic keys used can be made more difficult or completely prevented.

In an exemplary embodiment, an automation system with a head end in at least one series terminal is provided, wherein the head end has a first interface for connecting the head end to a data bus and at least a second interface for connecting the head end to a local bus. The head end further includes a first processing unit configured to control data transfer via a data bus and the local bus. At least one series terminal is formed by means of an interface for connection to the local bus, so that the series terminal is connected or connectable to the head end via the local bus.

Via the data bus, the head end can be connected to a higher-level control device so as to be able to access the head end and, if applicable, the series terminals behind it via the local bus. The local bus serves for data exchange between the head end and the connected series terminals.

Both series terminal and head end can have an insulating housing which has an electrical contact on at least one side, with which the series terminal or the head end can be connected to the local bus of the automation system. The electrical contact is designed such that when arranging the series terminal next to another series device (series terminal, head end) which has a corresponding electrical contact, the electrical contact of the series terminal electrically contacts/connects the electrical contact of the adjacent device, thus connecting the series terminal with the local bus. The same applies to the head end when it is electrically contacted by an adjacent device via the electrical contact. The electrical contact of both the head end and the series terminal forms the interface for connecting the head end and the series terminal with the local bus.

If the series terminal is a feed-through terminal, an electrical contact is likewise formed on the opposite housing side of the insulating housing, with which the series terminal can be connected to further series terminals. Between the two electrical contacts of the first and the second opposite side of the housing, an electrical bridge is provided, so as to forward data of the local bus from the first electrical contact to the second electrical contact. Thus, multiple series terminals can be connected in series to the local bus and exchange data with other series terminals or with the head end.

Such a generic automation system comprising a head end and at least one series terminal is inventively further developed in that the at least one series terminal can have a second processing unit, which has a memory area in which at least one cryptographical key is deposited. The first processing unit of the head end can be set up such that it has read-access to the cryptographic key in the memory area of the second processing unit of the series terminal via the local bus and can establish encrypted communication with at least one subscriber connected to the data bus via the data bus by means of the cryptographic key from the memory area of the second processing unit of the series terminal.

Due to the fact that the head end with the first processing unit only has read access to the memory area of the second processing unit via the local bus, it becomes significantly more difficult for potential attackers of the automation system to manipulate it such that the attacker is granted complete access to the automation device without authorization. This is because all cryptographical elements that are needed to establish the encrypted communication connection via the data bus between the head end and a connected subscriber are not located on the head end itself, but only in a read-only accessible memory area of the connected series terminal and are thus not readily accessible from the outside. A potential attacker having gained access to the head end is far from being able to compromise a corresponding encrypted connection over the data bus by manipulating the cryptographic key itself.

Furthermore, the present invention succeeds in simply replacing the keys merely by, for example, exchanging the series terminal in which the second processing unit with the cryptographic key stored in the memory area is located.

The first processing unit of the head end can be set up to control, restrict and/or block access to the memory area of the second processing unit of the series terminal via the data bus by means of a data filter, thus appropriately controlling and, if necessary, blocking access from outside within a firewall, i.e., to the memory area of the series terminal via the data bus. As a result, access to the automation system as to the respective authorization for accessing the components of the automation system can be very finely adjusted.

In addition, with the present invention it becomes possible to categorically open the automation system to the outside, so that subscribers can connect to the automation system via the data bus, for example, to change settings and configurations. At the same time, it makes it significantly more difficult or even impossible for potential attackers to take control of the automation system and manipulate it in such a way that access is no longer possible. By encapsulating the cryptographical key on one of the series terminals, stable and secure access can thus be granted, in particular with regard to the "Internet of Things".

The cryptographic key stored in the memory area of the second processing unit of the series terminal is a key pair with a public and a private key, wherein the public key and the private key correspond with one another to form a public key infrastructure. The first processing unit of the head end can be set up to establish encrypted communication via the data bus by means of a public key known to the subscriber connected to the data bus, which corresponds to the public key of the key pair, and is read out by means of the private key of the key pair from the storage area of the second processing unit of the series terminal.

If the public key is known to the respective other subscriber who is connected to the data bus for communication with the head end, a corresponding secure communication can be set up by means of the public key and the private key stored in the series terminal, such as is known, for example, in the case of a VPN connection (Virtual Private Network). In this case, when setting up the secure connection between the head end and the subscriber connected to the data bus, it is possible to accordingly access the PKI methods known from the prior art.

In addition, the head end is also set up to not only establish such a secure connection with an external subscriber based on the cryptographic key, but also to operate such a secure connection. This means that based on the negotiated encrypted connection, the data packets transmitted via the data bus are suitably cryptographically encrypted in order to ensure the secure connection.

The first processing unit of the head end can be set up to read out the public key of the key pair stored in the memory area of the second processing unit and to transmit it via the data bus to the subscriber connected to the data bus. Such a key exchange can then set up the secure connection. For this purpose, the subscriber connected to the data bus would receive the public key and generate an additional secret key, for example by using a random number generator, and then encrypt this secret key using the public key of the automation system and transmit it to the head end. It is not possible for potential attackers to access the encrypted secret key. After the head end has now received this encrypted message with the secret key, it can decrypt this encrypted message with the aid of the private cryptographic key which is stored in the memory area of the series terminal, and thus derive the secret key. In this way, a secret key has been exchanged between the subscriber and the head end without giving potential attackers the opportunity to access said secret key. The secure connection between the subscriber and the head end can then be induced by means of the secret key, for example in such a way that all data packets are encrypted with the secret key and then transmitted. Since both the subscriber and the head end know the secret key, such encrypted data packets can be repeatedly decrypted at the receiver.

The series terminal can be a series end terminal which has an electrical contact for contacting the local bus on only a single side of the housing. This way, for a large number of series terminals, the series terminal with the cryptographic key can be quickly identified on the hardware side and replaced if necessary.

The second processing unit of the series terminal can be set up to query and derive via the local bus a configuration of one, several or all of the devices of the automation system connected to the local bus, and, based on the holding configuration, to generate an individual cryptographic key for the automation system in conjunction with a secret cryptographic key stored in the series terminal and to store it in the memory area. Accordingly, based on the queried and the holding configuration of the devices connected via the local bus (other series terminals, head end), a corresponding individual cryptographic key is generated in conjunction with the secret cryptographic key stored in the series terminal, which is a function of both the configuration of the automation system on the one hand, and on the stored secret cryptographic key on the other. Due to the fact that the cryptographic key for the automation system also depends on the current configuration of the automation system itself, a very individual cryptographic key is generated, which cannot be known to others. This prevents compromising the system on account of data leaks and hardens the entire automation system. By shifting the generation of cryptographic keys to the series terminal, it also becomes more difficult for a potential attacker to invade the system and take full control.

An external control computer can be connected via the data bus to the head end and is set up to query and derive a configuration of one, several or all of the devices of the automation system connected to the local bus, and, based on the holding configuration, to generate an individual cryptographic key for the automation system in conjunction with a secret cryptographic key stored in the control computer, wherein the external control computer and the first processing unit of the head end are set up to establish encrypted communication with each other via the data bus by means of the cryptographic key from the memory area of the second processing unit of the series terminal and/or by means of the cryptographic key generated by the control computer. In this way, a corresponding two factor authentication for the encryption of the connection between the subscriber and the head end is generated, since in addition to the secret key, the configuration of the automation system is also read out and required to generate the corresponding cryptographic key for the link encryption.

Further, a series terminal is provided, wherein the series terminal for automation systems comprises an insulated housing comprising an electrical contact on at least one side of the housing with which the series terminal is connectable to a local bus of an automation system, wherein an electronic processing unit integrated in the series terminal is provided, which is connected to the at least one contact device and designed for transmitting and/or receiving data via the local bus.

The integrated electronic processing unit of the series terminal can be set up to query and derive a configuration of one, several or all devices of the automation system connected to the local bus via the local bus, and, based on the configuration derived, to generate an individual cryptographic key for the automation system in conjunction with a secret cryptographic key stored in the series terminal.

Based on the queried and derived configuration in conjunction with the secret cryptographic key stored in the series terminal, an individual cryptographic key for the automation system is generated, which is based both on the configuration of the automation system and on the stored secret cryptographic key.

Due to the fact that the cryptographic key for the automation system also depends on the current configuration of the automation system, a highly individual cryptographic key is generated which cannot be known to others. This prevents compromising the system on account of data leaks and hardens the entire automation system. In addition, by shifting the generation of cryptographic keys from the control module to one of the series terminals, it becomes more difficult for a potential attacker to invade the system and take full control.

The series terminal can be a series end terminal of which the insulating housing has an electrical contact only on a single side of the housing. The advantage here is that a series end terminal with the integrated processing unit for providing the cryptographic function is particularly suitable for retrofitting; such a series end terminal is fundamentally and inevitably part of an automation control. Without great effort, existing systems can thus be retrofitted.

The series end terminal can be a feed-through terminal, which in each case has an electrical contact on two opposite sides of the housing in order to on the one hand be connected to the data bus and on the other hand to provide forwarding of the data bus data to other series terminals. The two electrical contacts of the respective housing side are connected in the series feed-through terminal and can be tapped by the internal control of the series terminal.

The integrated electronic processing unit can be set up to store the generated individual cryptographic key in a key memory of the series terminal so that the generated cryptographic key can be accessed, for example, by a head end. In this case, the series terminal may be designed such that it exclusively allows read access to the cryptographic key stored in the key memory by the head end.

The integrated electronic processing unit of the series terminal can be configured to receive a secret cryptographic key via the local bus and store it in a key memory of the series terminal so that, for example, the secret cryptographic key can be deposited in the key memory of the series terminal as soon as the series terminal has been initialized. It would also be possible to subsequently deposit a license key, which is then consumed into an individual cryptographic key together with the current control configuration and can thus be used to check the authorization of use for the automation system.

The series terminal may advantageously further comprise an electrical connection device which is designed for connecting bus subscribers to the series terminal and for connecting the connected bus subscribers to the data bus. Thus, for example, sensors and/or actuators can be connected to the series terminal, which are then connected to the connected data bus with the aid of the integrated control of the series terminal, so that this way particularly, the connected bus subscribers (actuators/sensors) can be accessed via the control module and controlled in accordance with the automation.

The integrated electronic processing unit can be designed for validating a license key stored in the series terminal in the key memory as a function of the individual cryptographic key generated by the electronic processing unit so as to verify the use of the automation system with the help of the license key. For this purpose, first an externally generated license key is stored in advance in a key memory of the series terminal, wherein this externally generated license key is generated as a cryptographic key from a secret cryptographic key on the one hand, and from the current control configuration of the automation system on the other. When the automation system is started, validation is then requested, for example, by the control module or the head end, whereupon the integrated processing unit of the series terminal generates the individual cryptographic key of the automation system. Prior to this, the same, identical secret key was stored on the series terminal, with which the license key, which was stored in the series terminal, was also generated. After the series terminal has generated the individual cryptographic key, it compares this with the stored license key, wherein, if there is a match, the stored license key is classified as valid. In case of a mismatch, it must be assumed that the license is not valid at least for the automation system. In this case, the control module or the head end would receive feedback from the series terminal as to whether or not the stored license key could be validated, in which case the head end starts the application or not in dependence on the validation.

A method for secure communication via a data bus of an automation system is also provided, wherein the cryptographic key in the memory area of the second processing unit of the series terminal is read-accessed by means of the first processing unit of the head end and an encrypted communication is established with at least one subscriber connected to the data bus via the data bus by means of the cryptographic key from the memory area of the second processing unit of the series terminal.

A method of operating a cryptographic series terminal is also provided, wherein for this purpose a configuration of one, several or all devices of the automation system connected to the local bus via the local bus is queried and derived by the electronic processing unit of the series terminal, and, based on the derived configuration, an individual cryptographic key for the automation system is then generated in conjunction with a secret cryptographic key stored in the series terminal and is stored in the memory area.

The individual cryptographic key can be stored in a key memory of the series terminal. A secret cryptographic key can be derived via the local bus and stored in a key memory of the series terminal. In addition, a license key that can be stored in the key memory of the series terminal and can be validated in dependence on the individual cryptographic key generated by the electronic processing unit of the series terminal.

The cryptographic series terminal, which is designed to generate a cryptographic key based on the configuration derived in conjunction with a stored secret key, can be part of an automation system, for example, as described above. The series terminal described in the automation system can forms the basis for the cryptographic series terminal with the second processing unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
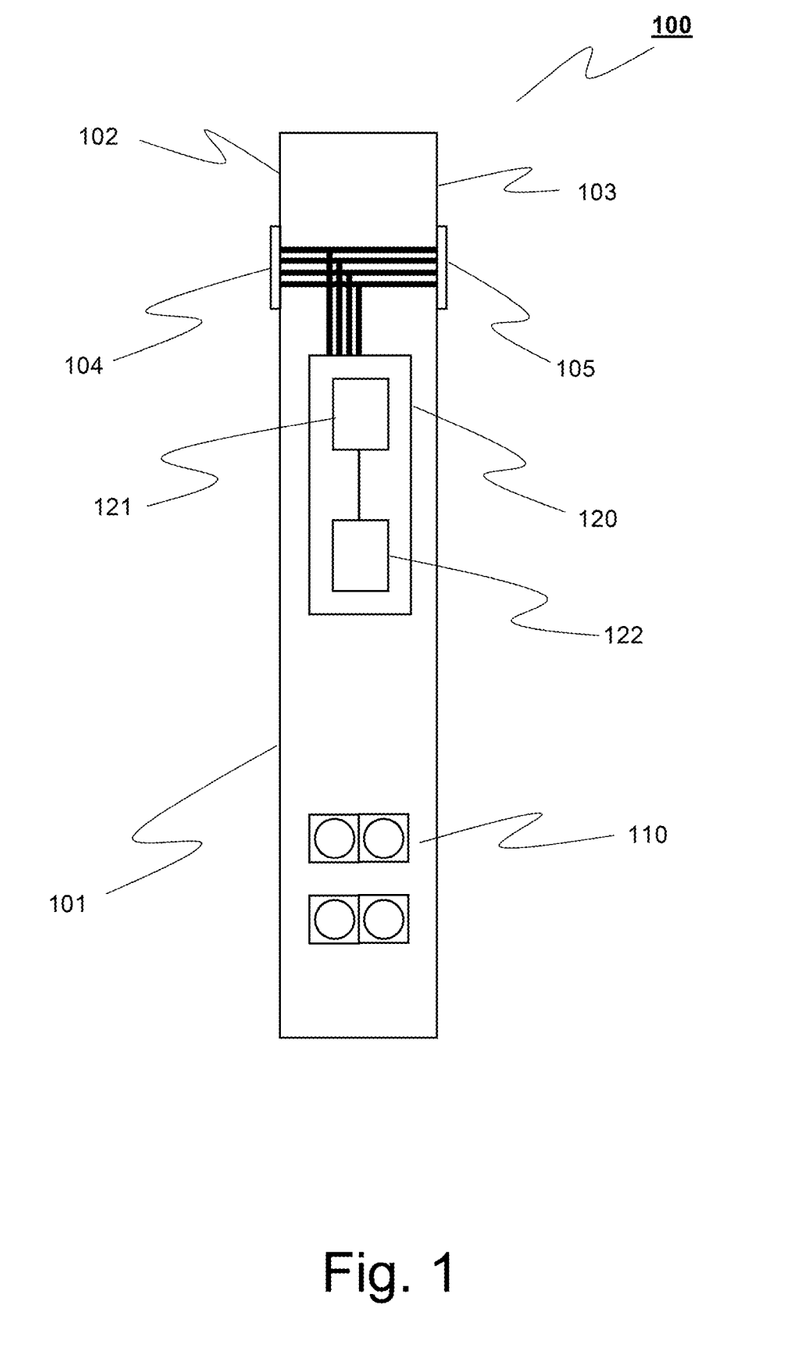
FIG. 1 is a schematic representation of a cryptographic series terminal.

FIG. 1 schematically shows a series terminal 100 according to the invention which has an insulating housing 101. On a first outer side 102 of the insulating housing 101, a first electrical contact (interface) is provided so as to connect the series terminal 100 with a local bus (not shown). On a second outer side 103 of the insulating housing 101, which is opposite the first outer side 102, a second electrical contact 105 is provided, so that further series terminals can be connected with the local bus. Between the first electrical contact 104 and the second electrical contact 105, a data bus bridge 106 is provided so that data in the form of an electrical signal received from the local bus by the first electrical contact 104 can be transmitted to the second electrical contact 105 for forwarding to other series terminals.

In the exemplary embodiment of FIG. 1, the series terminal 100 furthermore has one or more electrical connection devices 110, via which other bus subscribers can be connected to the series terminal. Such bus subscribers can be, for example, actuators and/or sensors.

In addition, the cryptographic series terminal 100 has an electronic processing unit 120 which is connected to the data bus bridge 106 and so is in communication with the data bus. The electronic processing unit 120 may be, for example, a microprocessor or a microcontroller-controlled data processing unit and have the elements provided by default, such as CPU, RAM and read-only memory.

At the logical level, the electronic processing unit 120 has a key generator 121 in order to be able to generate an individual cryptographic key. In addition, the electronic processing unit 120 has a key memory 122 in which the individual cryptographic key generated by the key generator 121 can be stored. In addition, the key memory 122 may also contain the secret key for generating the individual cryptographic key. The electronic processing unit 120 of the series terminal 100 may also be the second processing unit of the automation system shown later.

A utility can run on the electronic processing unit 120 that can receive requests for generating a cryptographic key from a head end and subsequently starts the key generator in the form of a software module to generate the individual cryptographic key. For this purpose, the electronic processing unit 120 is configured to query, read out and derive via the local bus the configuration of the devices (other series terminals and/or head ends) connected to the local bus, to which the series terminal 100 is connected via its electrical contacts 104, 105, in order to generate the individual cryptographic key.

Figure 2:
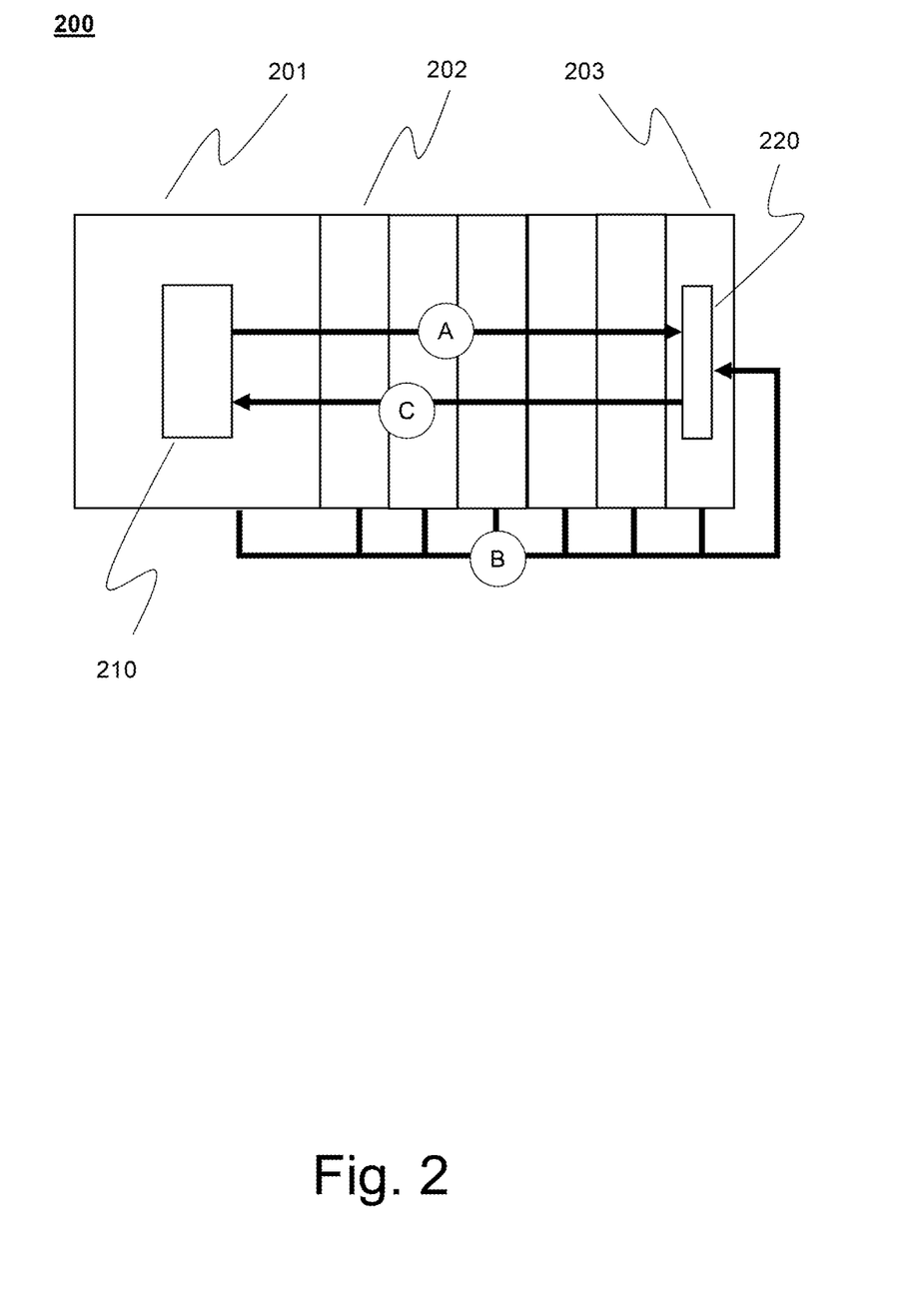
FIG. 2 is a schematic representation of an automation system comprising a cryptographic series terminal.

The sequence of the key generation is described schematically in FIG. 2 by way of the example of an illustrated automation system 200. The automation system 200 in this case has a head end 201 which initially contains the basic functionality for the control and, inter alia, also provides the local bus. In this case, a number of series terminals 202 are connected to the local bus, which are arranged next to each other and are in contact by an electrical contact of adjacent series terminals adjoining the respective contact, so that a continuous common local bus is formed. In the embodiment of FIG. 2, the sequence is then concluded with a cryptographic series end series terminal 203, as described in FIG. 1 as series terminal 100.

The head end 201 has a first processing unit 210 on which an application can run. The first processing unit 210 of the head end 201 is connected via the local bus to the second electrical processing unit 220 of the series end terminal 203 in order to carry out the inventive method accordingly.

In a first step A, the application running through the first processing unit 210 on the head end 201 can inject the process for generating a cryptographic key on the cryptographic series end terminal 203 by transmitting a corresponding command via the local bus to the series end terminal 203 which is then processed there by the second electronic processing unit 220.

In step B, the electronic processing unit 220 of the cryptographic series end terminal 203 reads out all the devices connected to the local bus and their configuration so that the complete configuration of the automation system 200 and its corresponding devices (control module 201, series terminals 202 and/or series end terminal 203) are available to the series end terminal 203 and its electronic processing unit 220.

Based on the configuration of the automation system 200 thus derived, as well as a secret cryptographic key stored in the key memory of the cryptographic series end terminal 203, an individual cryptographic key is then generated by the key generator of the series end terminal 203, which is a function of both the secret key and the current configuration of the automation system 200. If the configuration of the automation system 200 changes in only a single configuration value, then the individual cryptographic key would also change accordingly.

In step C, the individual cryptographic key thus generated is then provided to the first electronic processing unit 210 of the head end 201 via the local bus by the series end terminal 203 and its electronic processing unit 220, such that by means of the first electronic processing unit 210, the head end 201 for example has read access to this individual cryptographic key so as to be able to use it for more cryptographic functions. For example, the head end 201 can be connected to a higher-level external control computer, for example via a data line connected to the head end 201, wherein the communication between the external control computer and the head end 201 is encrypted on the generated individual cryptographic key. Thus, for this purpose, an encrypted connection (VPN tunnel) can be initialized, of which the cryptographic encryption is based on the individual cryptographic key. Individual data packets can be encrypted or decrypted using the individual cryptographic key.

Figure 3:
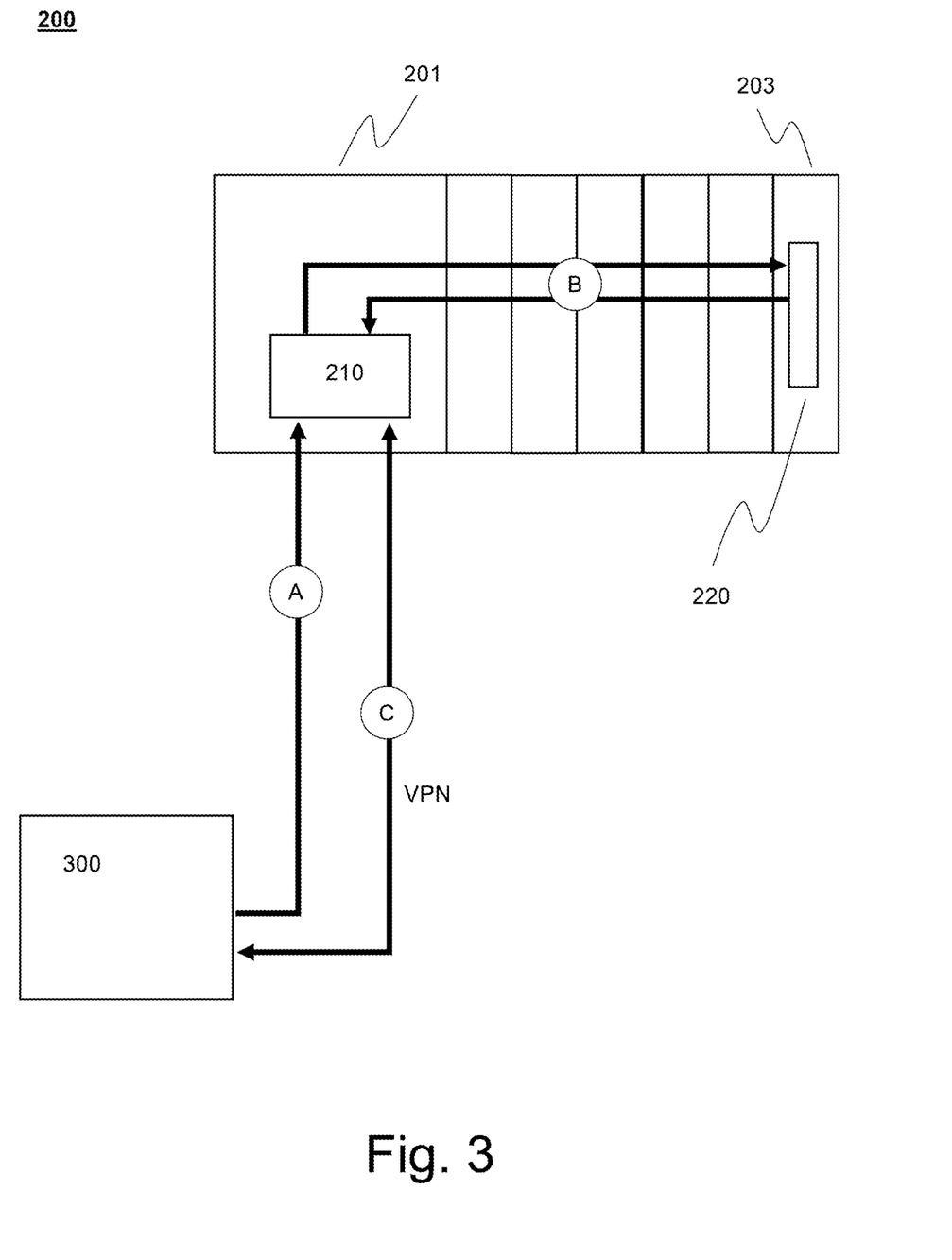
FIG. 3 is a schematic representation of the structure of an encrypted connection.

FIG. 3 shows an application scenario with the automation system 200 according to the invention in which the head end 201 of the automation system 200 is connected to an external control computer 300 via a data line. In order to secure communication between the external control computer 300 and the head end 201 of the automation system 200 and in particular to initialize it in an encrypted manner, it is provided that a VPN tunnel should be initialized between the control computer 300 and the head end 201, starting from the control computer 300.

For this purpose, in first step A, the control computer 300 first submits a corresponding query to the first processing unit 210 of the head end 201. Such a query may, for example, take place in such a way that a secret cryptographic key was encrypted using a public key of a key pair stored in the key memory of the second processing unit 220 of the series end terminal 203 and was thus received in encrypted form by the first processing unit 210 of the head end 201.

The first processing unit 210 of the head end 201 is designed such that it now has read access to the private key of the key pair stored in the key memory of the second electronic processing unit 220 of the series end terminal 203 in order to use the private key to be able to decrypt the query received from the control computer 300 in step A. This takes place in step B, where the first processor 210 queries the second processor 220 and then receives the private key.

However, read access in the sense of the present invention also means that the first processing unit 210 of the head end 201 transmits the encrypted message received from the control module 300 in step A to the second processing unit 220 of the series end terminal 203, with the request to decrypt said message using the private key. This prevents the private key from actually being transmitted to the head end 201. Subsequently, the decrypted message is transmitted back to the first processing unit 210 of the head end 201, so that it is present there in plain text.

In the subsequent initialization step C, secure communication is set up, for example in the form of a VPN tunnel, with the aid of the secret key that is available to the first processing unit 210 and the secret key that is available to the control computer 300.

The first electronic processing unit 210 of the head end 201 determines the public key of the series end terminal 203 during an initializing query of the control computer 300 and then transmits this to the control computer 300. The control computer 300 can then encrypt its correspondingly generated secret key with the public key thus transmitted, so that this message can only be decrypted by the private key stored in the key memory of the series end terminal 203.

In addition, it is advantageous if the first electronic processing unit 210 of the head end 201 is formed so as to control, restrict and/or block access from the outside, that is, from outside the local bus. This prevents, for example, the control computer 300 from accessing the private key from the outside.

Figure 4:
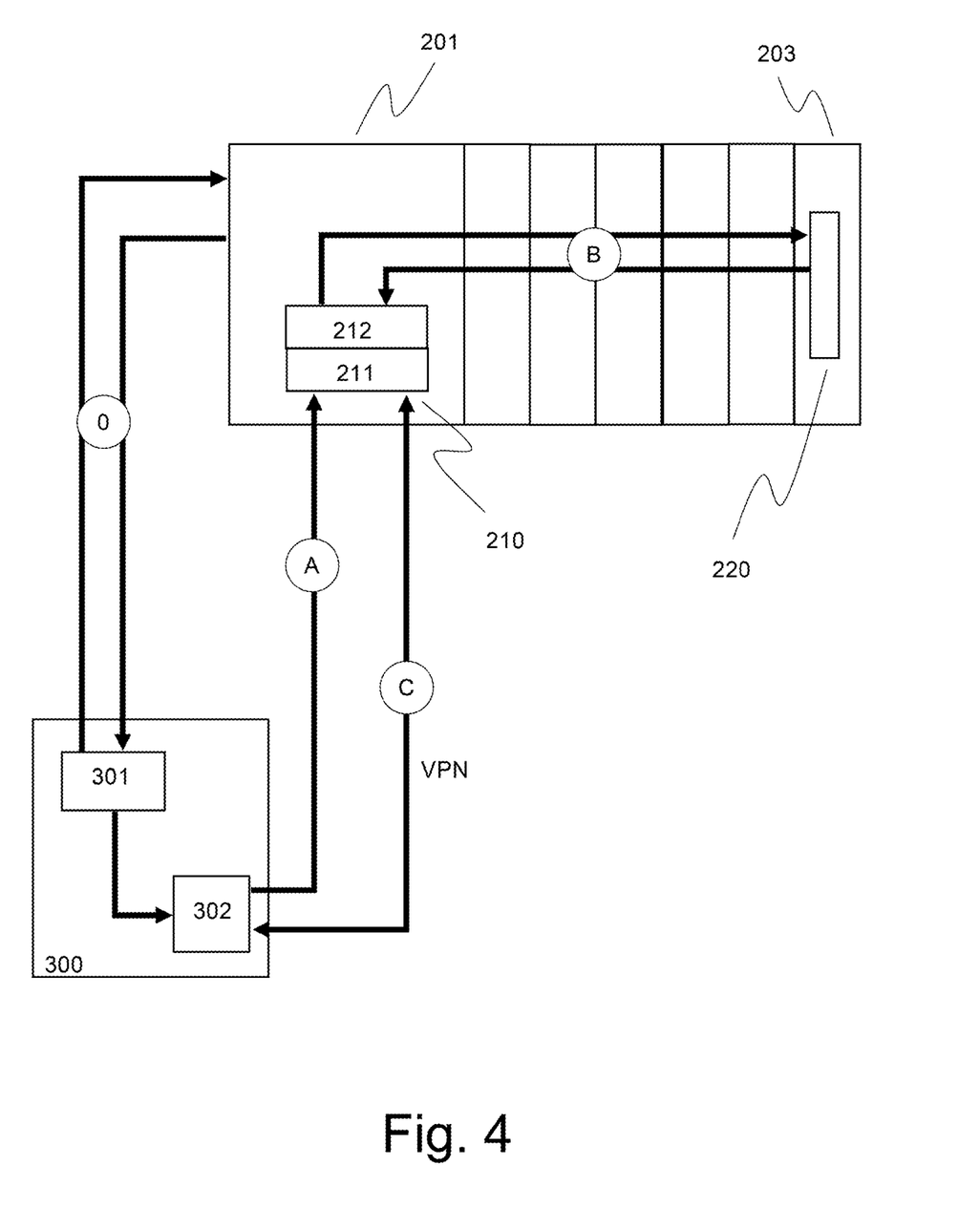
FIG. 4 is a schematic representation of a first embodiment.

FIG. 4 illustrates an application scenario which, similar to FIG. 3, is intended to establish a VPN connection between the control computer 300 and the head module 201. However, in this case in a previous initialization step 0, the current configuration of the automation system 200 is queried by the control computer 300. For this purpose, a corresponding request is sent via a data line to the head end 201, which then transmits the entire configuration to a key generator 301 of the control computer 300. This configuration can also contain values of the individual devices connected to the local bus of the automation system 200 so that the control module 201 for such a request in particular reads out the configuration of the devices connected to the local bus (analogous to the procedure of the cryptographic series end terminal 203).

After receiving the configuration of the automation system 200 by the key generator 301 of the control computer 300, based on a secret cryptographic key known to the key generator 301 and the determined current configuration of the automation system 200, an individual cryptographic key is then generated, which is subsequently transmitted to a VNP application 302 of the control computer 300. The VPN application 302 then initiates a VPN connection in an opposite VPN application 211 of the head end 201, with the aim of establishing an encrypted VPN connection between the head module 201 and the control computer 300. The VPN application 211 of the head end 201 then triggers the application 212 of the head end 201 in order to request the individual cryptographic key from the cryptographic series end terminal 203. If said cryptographic key has already been generated by the cryptographic series terminal 203, then the individual cryptographic key must only be read out from the key memory. Otherwise, the individual cryptographic key must first be generated by the cryptographic series end terminal 203, as already described above (for example, FIG. 1). For this also, the configuration of the automation system and a secret key are used to generate the cryptographic key. As a result, the individual cryptographic key is then transmitted at the end of step B via the local bus to the head end 201 and the local application 212.

The application 212 then hands over individual cryptographic key delivered by the cryptographic series end terminal 203 to the VPN application 211 of the head end 201 so that the VPN tunnel can then be negotiated and initialized in accordance with the remote station 302 of the control computer 300 (fourth step C).

With the aid of the initialized VPN tunnel it is then possible to access the head end 200 and thus be able to adapt in particular the corresponding configuration.

In order to initialize the VPN tunnel, it is necessary that both the series end terminal 203 and the key generator 301 of the control computer 300 know the secret cryptographic key, which can be achieved, for example, by this secret cryptographic key being loaded onto both devices, i.e., the control computer 300 and the cryptographic series end terminal 203, in one configuration step. The control computer 300 and the cryptographic series terminal 203 can exchange the secret cryptographic key, which can be done, for example, by means of known key exchange methods based on a PKI (private key infrastructure). Here, a public key stored in the series end terminal 203 is provided to the control computer 300 so as to be able to encrypt the secret key and transmit it to the head end 201. There, the secret key is then stored in the key memory of the series end terminal 203, wherein this secret key is then known to both the series end terminal 203 and the control computer 300 and serves as the basis for creating the secret key based on the current configuration of the automation system.

Figure 5:
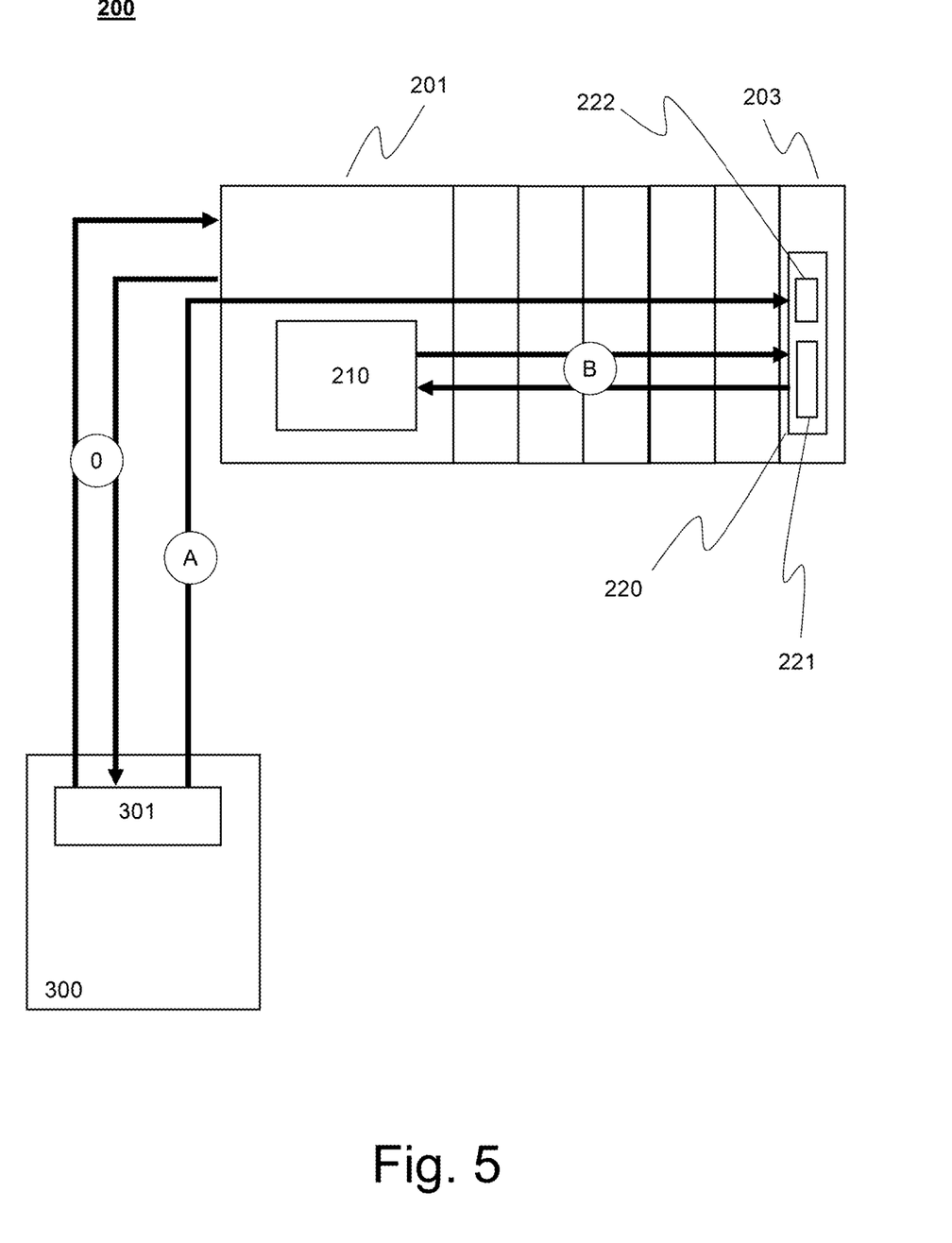
FIG. 5 is a schematic representation of a second embodiment.

FIG. 5 shows an application scenario in which the head end 201 of the automation system validates a license key stored in the cryptographic series end terminal 203. For this purpose, in a first initialization step 0 analogous to the procedure in FIG. 4, the configuration of the automation system 200 is read out by a control computer 300 and loaded in a key generator 301 of the control computer 300. Based on the configuration of the automation system 200 and a secret key, this key generator 301 then generates an individual cryptographic key which is then stored in the key memory 222 of the second electronic processing unit 220 of the cryptographic series end terminal 203 (step A). This can also be done, for example, by first establishing a secure connection with the aid of the head end 201 and a PKI method, and then depositing the key accordingly.

If an application is now started on the first processing unit 210 of the head end 201, the valid license is first checked in an initialization phase. For this purpose, the application of the head end 201 makes a corresponding request to the key generator 221, which then generates an individual cryptographic key based on the current configuration of the automation system 200 and a secret key. The secret key must be identical to the secret key known to the key generator 301. The individual cryptographic key is generated by the key generator 221 of the cryptographic series end terminal 203 in the manner already described above.

Subsequently, the second electronic processing unit 220 of the cryptographic series end terminal 203 compares the individual cryptographic key generated by the key generator 221 with the license key stored in the key memory 222 of the cryptographic series end terminal 203, and the license key is correspondingly validated as a function of the comparison.

The comparison result is returned to the application of the head module 201 in the form of a validation result so that the application now knows whether the validation of the license key by the cryptographic series terminal 203 has succeeded or failed. If the validation of the license key was successful, the application completely launches the implemented software on the head module 201 by means of the first processing unit 210. In the event of failed validation, various scenarios are possible, ranging from limited functionality to a complete refusal to start the required control software.

By using a public key infrastructure, the required secret keys can be transmitted to the series terminal 203 by the control computer 300.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An automation system comprising:
   a head end having a first interface for connecting the head end to a data bus and at least one second interface for connecting the head end to a local bus;
   a first processing unit provided in the head end and configured to control data transfer between the data bus and the local bus; and
   at least one series terminal formed via an interface for connecting to the local bus so that the series terminal is connectable or connected to the head end via the local bus, the at least one series terminal having a second processing unit that has a memory area in which at least one cryptographic key is stored,
   wherein the first processing unit of the head end has read access via the local bus to the cryptographic key in the memory area of the second processing unit of the series terminal and establishes encrypted communication with at least one subscriber connected to the data bus via the data bus via the cryptographic key in the memory area of the second processing unit of the series terminal.

2. The automation system according to claim 1, wherein the first processing unit of the head end is set up to control, restrict and/or block access via the data bus to the storage area of the second processing unit of the series terminal using a data filter device.

3. The automation system according to claim 1, wherein the cryptographic key stored in the memory area of the second processing unit of the series terminal is a key pair with a public and a private key, wherein the first processing unit of the head end is configured to set up the encrypted communication via the data bus via a public key known to the subscriber which is connected to the data bus, which corresponds to the public key of the key pair, and via the private key of the key pair that is read out from the memory area of the second processing unit of the series terminal.

4. The automation system according to claim 3, wherein the first processing unit of the head end is configured to transmit via the data bus the public key of the key pair stored in the memory area of the second processing unit to the subscriber connected to the data bus transfer.

5. The automation system according to claim 1, wherein the series terminal is a series end terminal having an electrical contact for contacting the local bus on only a single side of the housing.

6. The automation system according to claim 1, wherein the second processing unit of the series terminal is set up to query and derive via the local bus a configuration of one, several or all devices of the automation system connected to the local bus and, based on the configuration derived, to generate an individual cryptographic key for the automation system in conjunction with a secret cryptographic key stored in the series terminal and to store the individual cryptographic key in the memory area.

7. The automation system according to claim 6, wherein an external control computer is provided, which is connected via the data bus with the head end and is set up to query and derive a configuration of one, several or all devices of the automation system connected to the local bus from the head end and, based on the configuration derived, to generate an individual cryptographic key for the automation system in conjunction with a secret cryptographic key stored in the control computer, wherein the external control computer and the first processing unit of the head end are set up to establish an encrypted communication with each other via the data bus via the cryptographic key from the memory area of the second processing unit of the series terminal and/or by means of the cryptographic key generated by the control computer.

8. A series terminal for automation systems, the series terminal comprising:
an insulating housing having an electrical contact on at least one side of the housing with which the series terminal is connectable to a local bus of an automation system; and
an electronic processing unit integrated in the series terminal, the electronic processing unit being connected to the at least one contact device and is adapted to transmit and/or receive data via the local bus,
wherein the integrated electronic processing unit of the series terminal is arranged to query and derive via the local bus a configuration of one, several or all of the devices of the automation system that are connected to the local bus and, based on the configuration derived, to generate an individual cryptographic key for the automation system in conjunction with a secret cryptographic key stored in the series terminal.

9. The series terminal according to claim 8, wherein the series terminal is a series end terminal of which the insulating housing has an electrical contact on only a single side of the housing.

10. The series terminal according to claim 8, wherein the integrated electronic processing unit is set up to store the generated individual cryptographic key in a key memory of the series terminal.

11. The series terminal according to claim 8, wherein the integrated electronic processing unit is set up to receive a secret cryptographic key via the local bus and to store it in a key memory of the series terminal.

12. The series terminal according to claim 8, wherein the integrated electronic processing unit is set up to validate a license key stored in the series terminal in the key memory as a function of the individual cryptographic key generated by the electronic processing unit.

13. A method for secure communication via a data bus of an automation system comprising a head end and at least one series terminal connected to the head end via a local bus,
controlling, via a first processing unit of the head end, the data transmission between the data bus and the local bus;
storing a cryptographic key in a memory area of a second processing unit of the series terminal, wherein, via the first processing unit of the head end, the cryptographic key in the memory area of the second processing unit of the series terminal is read-accessed; and
establishing an encrypted communication via the data bus by the cryptographic key from the memory area of the second processing unit of the series terminal with at least one subscriber connected to the data bus.

14. The method according to claim 13, wherein access via the data bus to the memory area of the second processing unit of the series terminal is controlled, restricted and/or blocked by the first processing unit of the head end using a data filter device.

15. The method according to claim 13, wherein the cryptographic key stored in the memory area of the second processing unit of the series terminal is a key pair with a public and a private key, wherein via the first processing unit of the head end, the encrypted communication via the data bus is set up via a public key known to the at least one subscriber that is connected to the data bus, which corresponds to the public key of the key pair, and via the private key of the key pair read out from the memory area of the second processing unit of the series terminal (100, 203).

16. The method according to claim 15, wherein the public key of the key pair stored in the memory area of the second processing unit is transmitted via the data bus by the first processing unit of the head end to the subscriber that is connected to the data bus.

17. The method according to claim 13, wherein a configuration of one, several or all devices of the automation system connected to the local bus is queried and derived via the local bus by the second processing unit of the series terminals and, based on the configuration derived, an individual cryptographic key for the automation system is generated in conjunction with a secret cryptographic key stored in the series terminal and is stored in the memory area.

18. The method according to claim 13, wherein, via an external control computer that is connected via the data bus to the head end, a configuration of one, several or all devices of the automation system connected to the local bus is queried and derived by the head end and, based on the configuration derived, an individual cryptographic key for the automation system is generated in conjunction with a secret cryptographic key stored in the control computer, wherein an encrypted communication between the head end and the external control computer is set up via the data bus via the cryptographic key from the memory area of the second processing unit of the series terminal and/or via the cryptographic key generated by the control computer.

* * * * *